US012404040B1

(12) United States Patent
Hill, IV et al.

(10) Patent No.: US 12,404,040 B1
(45) Date of Patent: Sep. 2, 2025

(54) METHODS AND APPARATUS FOR DETERMINANT ASSEMBLY SUPPORT

(71) Applicant: The Boeing Company, Arlington, VA (US)

(72) Inventors: Chester James Hill, IV, Grafton, IL (US); Jason Layne Collins, St. Peters, MO (US); Gregg Joseph Zeisler, Jr., St. Charles, MO (US); Blake Carl Kohlmeyer, Ballwin, MO (US); Nabil Saleh, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/656,243

(22) Filed: May 6, 2024

(51) Int. Cl.
*B64F 5/10* (2017.01)
*B64C 1/12* (2006.01)

(52) U.S. Cl.
CPC . *B64F 5/10* (2017.01); *B64C 1/12* (2013.01)

(58) Field of Classification Search
CPC ... B64F 5/50; B21J 15/42; B23P 19/04; B23P 2700/01; B25B 11/00; B25B 5/003; B25B 5/14; B25H 1/10; B64C 1/069; Y10S 269/90; Y10S 269/91; Y10T 29/4978; Y10T 29/49826; Y10T 29/53091; Y10T 29/53961; Y10T 29/53974
See application file for complete search history.

(56) References Cited

U.S. PATENT DOCUMENTS 5,542,796 A * 8/1996 Bratten .................. B23B 41/00
408/234

\* cited by examiner

*Primary Examiner* — Jason L Vaughan
*Assistant Examiner* — Amanda Kreiling
(74) *Attorney, Agent, or Firm* — Hanley, Flight & Zimmerman, LLC

(57) ABSTRACT

Methods and apparatus for determinant assembly support are disclosed. A disclosed example apparatus to support a panel component for determinant assembly thereof includes a support frame that is releasably couplable to a jig, a first clamp to support the panel component at a first position of the panel component, a first body of the first clamp or the support frame including a nominal clearance opening to receive a first fastener to operatively couple the first clamp to the support frame, and a second clamp to support the panel component at a second position of the panel component different from the first position, a second body of the second clamp or the support frame including a slotted opening to receive a second fastener to operatively couple the second clamp to the support frame, the second fastener movable about the slotted opening to enable the second clamp to reduce forces imparted to the panel component while held by the support frame.

20 Claims, 12 Drawing Sheets

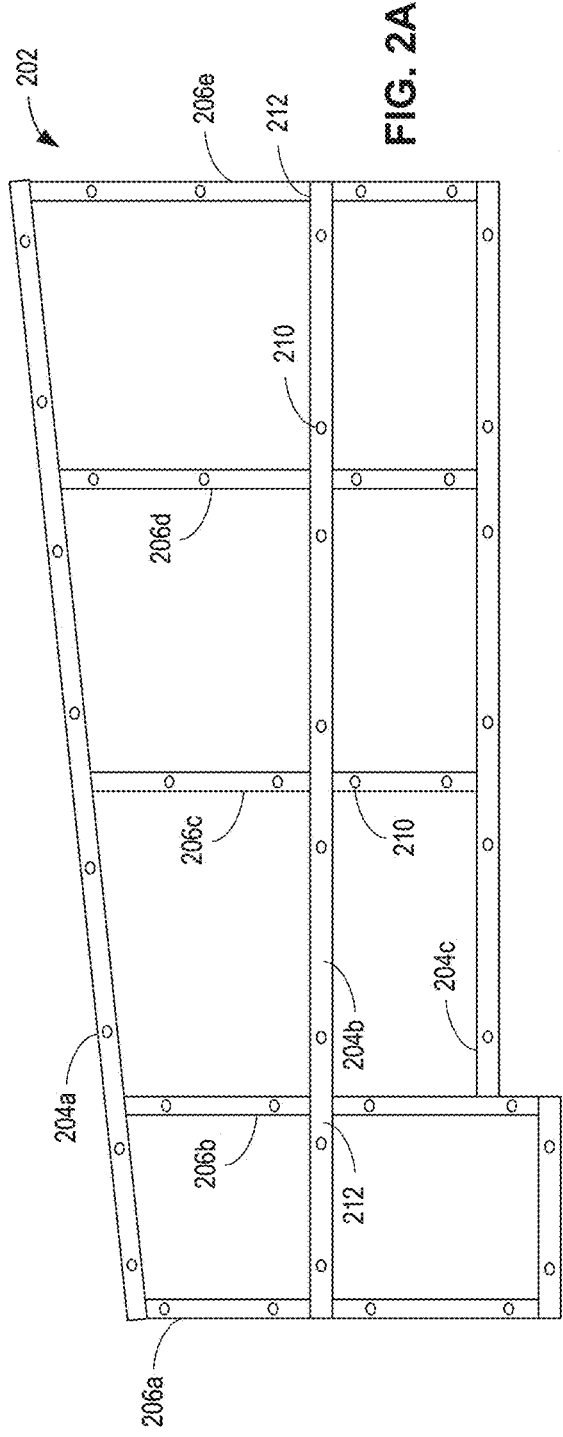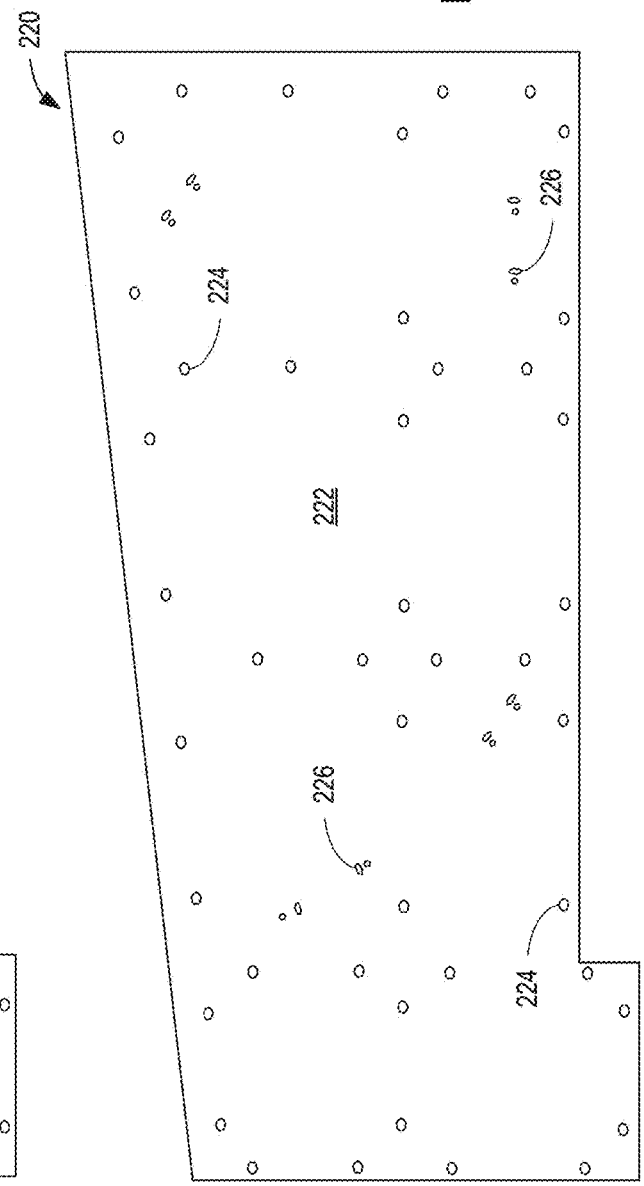

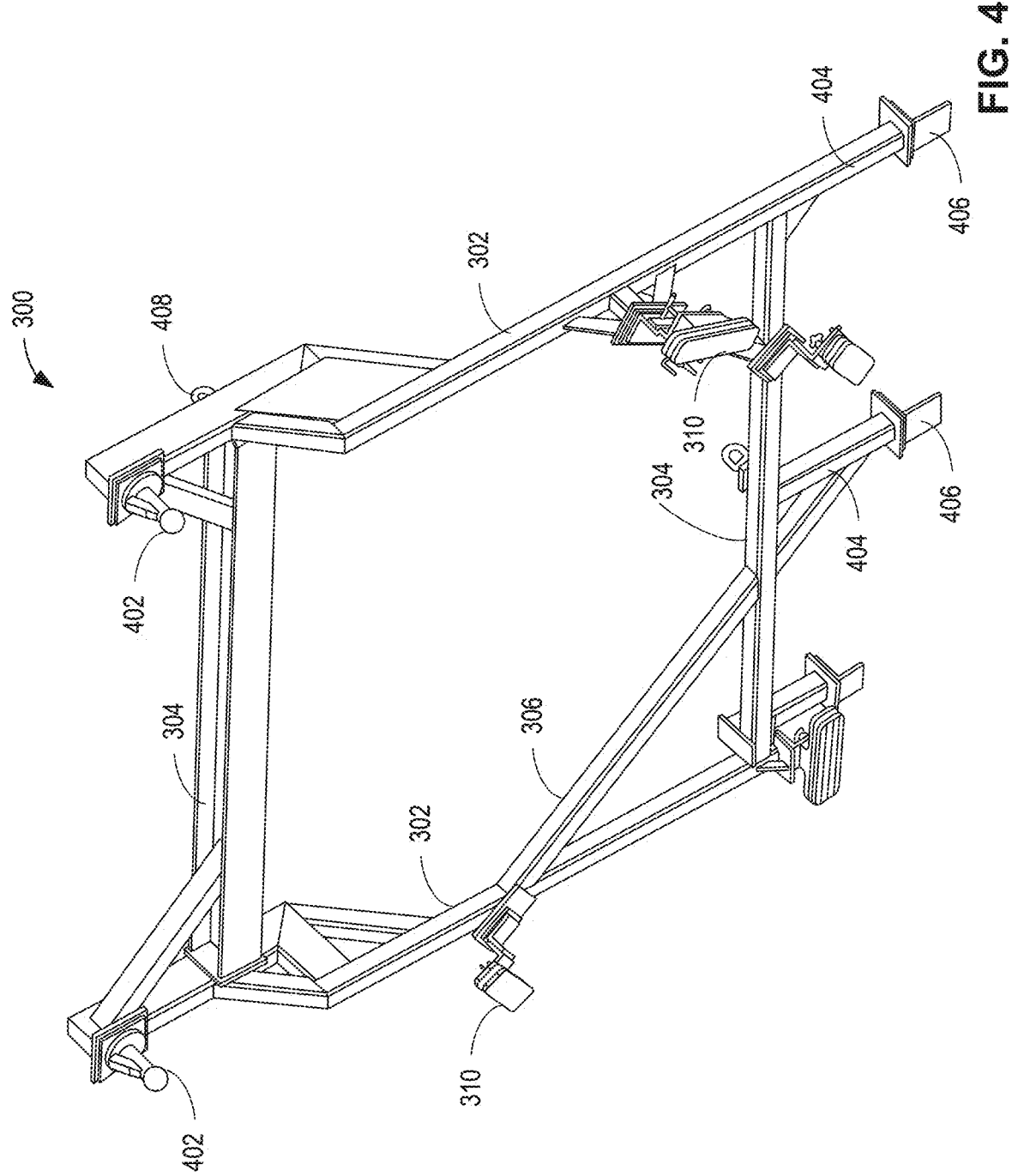

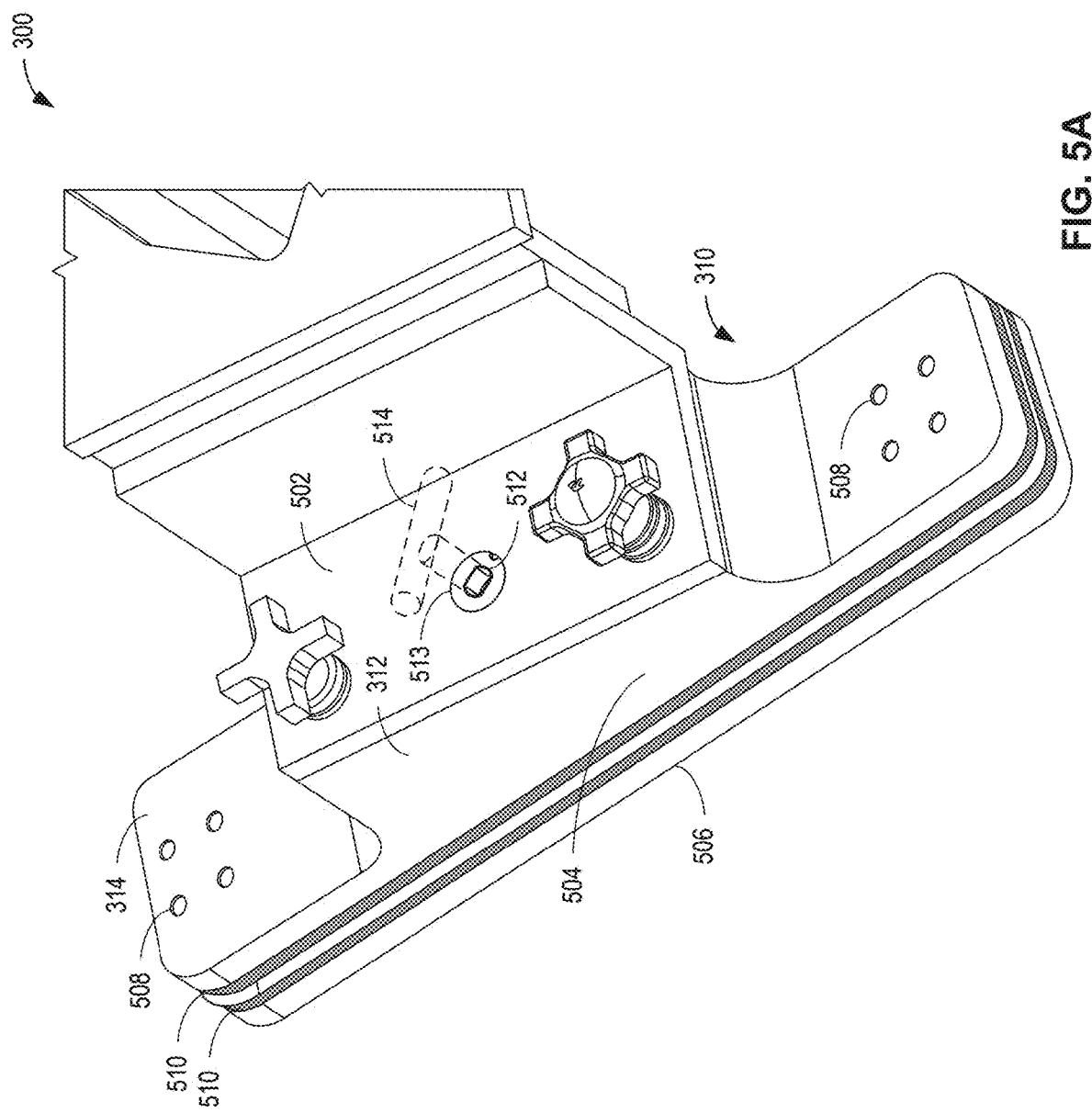

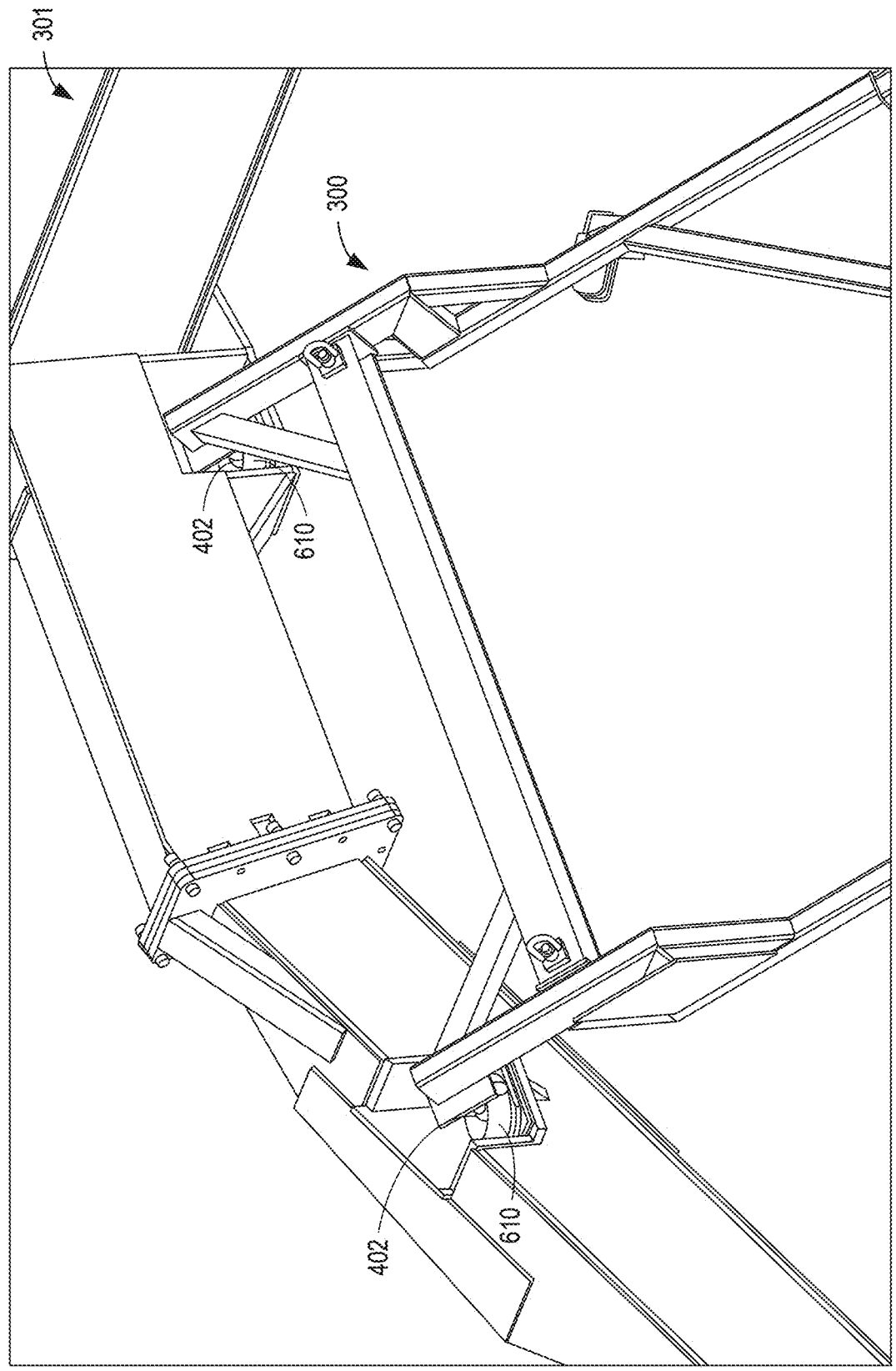

METHODS AND APPARATUS FOR DETERMINANT ASSEMBLY SUPPORT

FIELD OF THE DISCLOSURE

This disclosure relates generally to tooling/manufacturing and, more particularly, to methods and apparatus for determinant assembly support.

BACKGROUND

For aircraft applications, parts and/or components can have a significant weight, as well as size. For example, aircraft panels, such as those utilized in fuselage or wing sections, can be relatively large such that portions thereof can displace relative to another based on a weight distribution and a manner in which the panels are handled and/or constrained.

SUMMARY

An example apparatus to support a panel component for determinant assembly thereof includes a support frame that is releasably couplable to a jig, a first clamp to support the panel component at a first position of the panel component, a first body of the first clamp or the support frame including a nominal clearance opening to receive a first fastener to operatively couple the first clamp to the support frame, and a second clamp to support the panel component at a second position of the panel component different from the first position, a second body of the second clamp or the support frame including a slotted opening to receive a second fastener to operatively couple the second clamp to the support frame, the second fastener movable about the slotted opening to enable the second clamp to reduce forces imparted to the panel component while held by the support frame.

An example method for determinant assembly of a structural assembly for use with an aircraft includes coupling, with a first fastener, a first clamp supported by a support frame to a first portion of the panel, the first clamp including a nominal clearance interface with respect to the support frame, coupling, with a second fastener, a second clamp supported by the support frame to a second portion of the panel different from the first portion, the second clamp including a slot interface with respect to the support frame, and coupling the support frame to an assembly jig, positioning adjoining frame sections having mating apertures relative to each other and relative to apertures in the panel, and installing fasteners through apertures in the panel and mating apertures in the adjoining frame sections, such that each of the frame sections are assembled to an adjoining frame section to form an assembled frame structure fastened to a panel to yield a structural assembly.

An example support frame for determinant assembly of a vehicle panel includes first and second holders carried by the support frame, the first and second holders including or supporting first and second clamps, respectively, to carry the vehicle panel at different areas thereof, a nominal clearance interface to constrain the first holder or the second holder, and a slotted interface on another of the first holder or the second holder to enable movement thereof to reduce forces imparted onto the vehicle panel.

An example method of determinant assembly of a vehicle panel includes placing a first clamping holder of a support frame at a first position of the panel, the first clamping holder having a nominal clearance interface with the support frame, placing a second clamping holder of the support frame at a second position of the panel different from the first position, the second clamping holder having a slot interface with the support frame to enable movement of the second clamping holder, and coupling frame section to the panel while the panel is supported by the first and second clamping holders.

An example apparatus for determinant assembly of an aircraft panel includes a support frame having a plurality of support beams, and first and second opposing holders supported by the support frame, the first holder having a nominal clearance fit to the support frame, the second holder having a slotted fit to the support frame for movement thereof, the first and second holders each having an aperture to receive a fastener to couple the first and second holders to the panel.

BRIEF DESCRIPTION OF THE DRAWINGS

FIGS. 2A and 2B illustrate example components that can be assembled with examples disclosed herein.

FIG. 4 illustrates the example manufacturing structure of FIGS. 3A and 3B.

FIGS. 5A and 5B are detailed views of example clamps in accordance with teachings of this disclosure.

FIGS. 6A-6C illustrate the example manufacturing structure of FIGS. 3A-5 during a manufacturing process.

Figure 1:
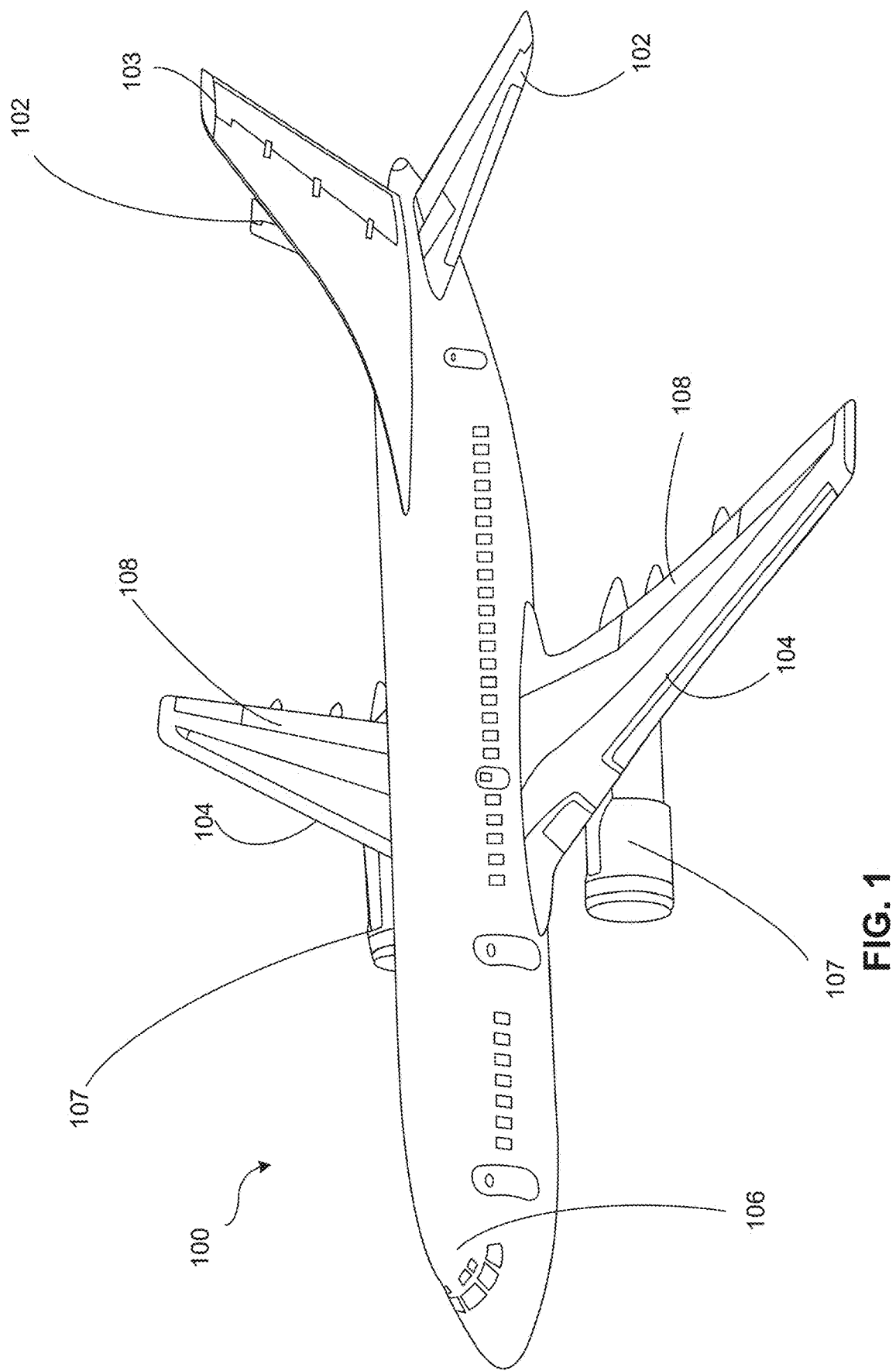
FIG. 1 illustrates an example aircraft in which examples disclosed herein can be utilized for the manufacture thereof.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Methods and apparatus for determinant assembly support are disclosed. In manufacturing environments, handling of a relatively large component in combination with its weight distribution can cause the component to warp and/or displace under the influence of gravity. For example, an aircraft fuselage panel can bend, warp and/or twist based on a distribution of weight over a relatively large distance. As a result, the panel can misalign to another component, such as a frame component and/or assembly. In turn, features of the panel can be difficult to align with corresponding features of the other component and, thus, assembly and/or handling thereof can be difficult. As a result, the component may necessitate reworking or may be rejected, thereby resulting in an increased repair and/or rework time, for example.

Examples disclosed herein are effective in mitigating the effects of gravity or other forces imparted on relatively large components such as skin panels, for example. Examples disclosed can enable more efficient and time-saving assembly of components by mitigating the effects of gravity or other forces that can adversely impact assembly of relatively large components. Examples disclosed herein can also reduce a need for setting up and/or updating tooling indexes by mitigating tolerance issues of relatively large components. While examples disclosed herein are described in the context of aircraft, examples disclosed herein can be applied to any other appropriate type of assembly and/or structure that is stationary or movable.

Examples disclosed herein utilize a frame (e.g., a support frame) that is releasably couplable to a support jig (e.g., an assembly jig, a manufacturing jig, etc.) corresponding to a determinant assembly process. Examples disclosed herein utilize multiple holding devices, such as clamps, to carry and/or support a panel component (e.g., a vehicle panel, an aircraft panel, a fuselage panel, etc.). While the examples describe support of a panel component such as a skin panel, for example, it should be understood that the panel component may be an elongate workpiece, plate or other structure having a plurality of holes for fastening the panel component to a frame structure. According to some examples disclosed herein, multiple clamps are utilized to couple the panel component to the support frame. In particular, a first clamp can define or include a first aperture to receive a first fastener and/or a pin, with a nominal clearance while a second clamp can define or include a second aperture to receive a second fastener and/or a pin. In particular, the second aperture has an increased clearance relative to the second fastener and/or pin greater than the nominal clearance relative to the first fastener and/or pin. As a result, the second clamp can displace, translate and/or rotate relative to the frame and/or the first clamp to a greater degree than the first clamp, thereby reducing forces and/or distortions imparted to the panel component (e.g., forces due to gravity) while the panel component is being supported by the support frame. As a result, the part can be distorted and/or warped to an extent that can make it difficult to assemble other components thereto.

In some examples, the first and second clamps are positioned on the support frame in opposing directions and/or positions from one another. In some such examples, the first and second clamps include a compressible material and/or a compressible body between corresponding clamping bodies/surfaces. In some such examples, the compressible material is compressed against the component to securely hold the component without imparting significant forces thereto. In some examples, the first and second clamps include tabs with apertures to receive a fastener and/or a pin to couple the panel component to the first and second clamps. In some examples, the support frame is rotationally coupled to the aforementioned assembly jig such that the support frame can be rotated relative to the assembly jig when coupled thereto. In some such examples, the support frame may be rotated until stops of the support frame contact a portion of the assembly jig and prevent further rotation of the support frame. Additionally or alternatively, the support frame may rotate under the influence of gravity until the stops of the support frame contact the portion of the assembly jig.

As used herein, the terms "nominal clearance," "nominal clearance opening" or "a nominal interface" refer to a fit in which a first component has a relatively small clearance relative to a second component. As used herein, the terms "slotted," "slotted opening" or "a slotted interface" refer to a fit in which a first component has a relatively large clearance relative to a second component such that the second component can move, rotate and/or translate relative to the first component. As used herein, the term "fastener" refers to any aligning or locking device, mechanism, application, process and/or assembly that at least partially constrains a first component to a second component). As used herein, the term "frame" can refer to any understructure, superstructure, side-supportive structure or a variation thereof utilized to support an object, structure and/or component.

FIG. 1 illustrates an example aircraft 100 in which examples disclosed herein can be implemented. In particular, examples disclosed herein can be utilized to produce components and/or parts associated with the aircraft 100, for example. In the illustrated example of FIG. 1, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers.

In the illustrated example of FIG. 1, internal components and/or assemblies are located in the fuselage 106 (and other external components) of the aircraft 100. Examples disclosed herein can be applied to any appropriate internal or external structure and/or vehicle. Accordingly, examples disclosed herein can be utilized for rotorcraft, spacecraft, watercraft, submersibles, unmanned aerial vehicles, or stationary structures, etc. Examples disclosed herein can be utilized for any appropriate structure that can be adversely affected by gravity and/or distortions caused by gravity, for example. In a particular scenario, examples disclosed herein can effectively support a panel of the fuselage 106 and can reduce warpage and/or distortion thereof to facilitate assembly of frame components thereto.

FIGS. 2A and 2B illustrate example components that can be assembled with examples disclosed herein. Turning to FIG. 2A, a frame structure 202 for a vehicle, which is an aircraft in this example, is shown. In the illustrated example of FIG. 2, various individual frame sections form the frame structure 202, where individual frame sections including spars 204 (hereinafter spars 204a, 204b, 204c, etc.) are shown in conjunction with ribs 206 (hereinafter ribs 206a, 206b, 206c, 206d, 206e, etc.). In this example, each of the spars 204a, 204b, 204c, and ribs 206a, 206b, 206c, 206d, 206e includes apertures 210. Further, the example spars 204 are coupled to the ribs 206 at joints 212. In other words, the spars 204 and ribs 206 and/or subcomponents thereof are configured to be coupled to one another. In this particular example, the frame structure 202 is utilized to fabricate a wing to be coupled to a fuselage (e.g., the fuselage 106 of FIG. 1) or other panel component/structure.

FIG. 2B depicts an example panel (e.g., a vehicle panel, an internal panel, an external panel, an aircraft skin, an aircraft fuselage panel, an exterior vehicle surface, a wing panel, a wing surface, a skin panel, an external panel, etc.) 220. In the illustrated example of FIG. 2B, the panel 220 includes a surface body (e.g., a curved planar body, a relatively flat planar body, etc.) 222 having apertures 224, 226. In this example, the apertures 224 are generally circular. Additionally, or alternatively, the apertures 226 are ellipsoid and/or oval. In this example, positions and/or relative positions of the apertures 224, 226 correspond to the apertures 210 in the vehicle frame structure 202 shown in FIG. 2A such that the apertures 210 in the frame structure 202 generally align with the apertures 224, 226 in the panel 220. In other words, aperture patterns between a frame structure and a panel and/or workpiece are to have fasteners installed therethrough to assemble the panel and the frame structure. However, the weight of a hoist frame that is attached to a panel 220 can cause deflection and/or distortion of the panel 220, such that the apertures 224, 226 in the panel 220 may no longer align with apertures in the frame structure 202. Similarly, the weight of a completely assembled frame structure 202 may induce distortion or deflection across the length of frame sections such that apertures 210 in the frame structure 202 may no longer align with apertures 224, 226 in the panel 220.

Figure 3A:
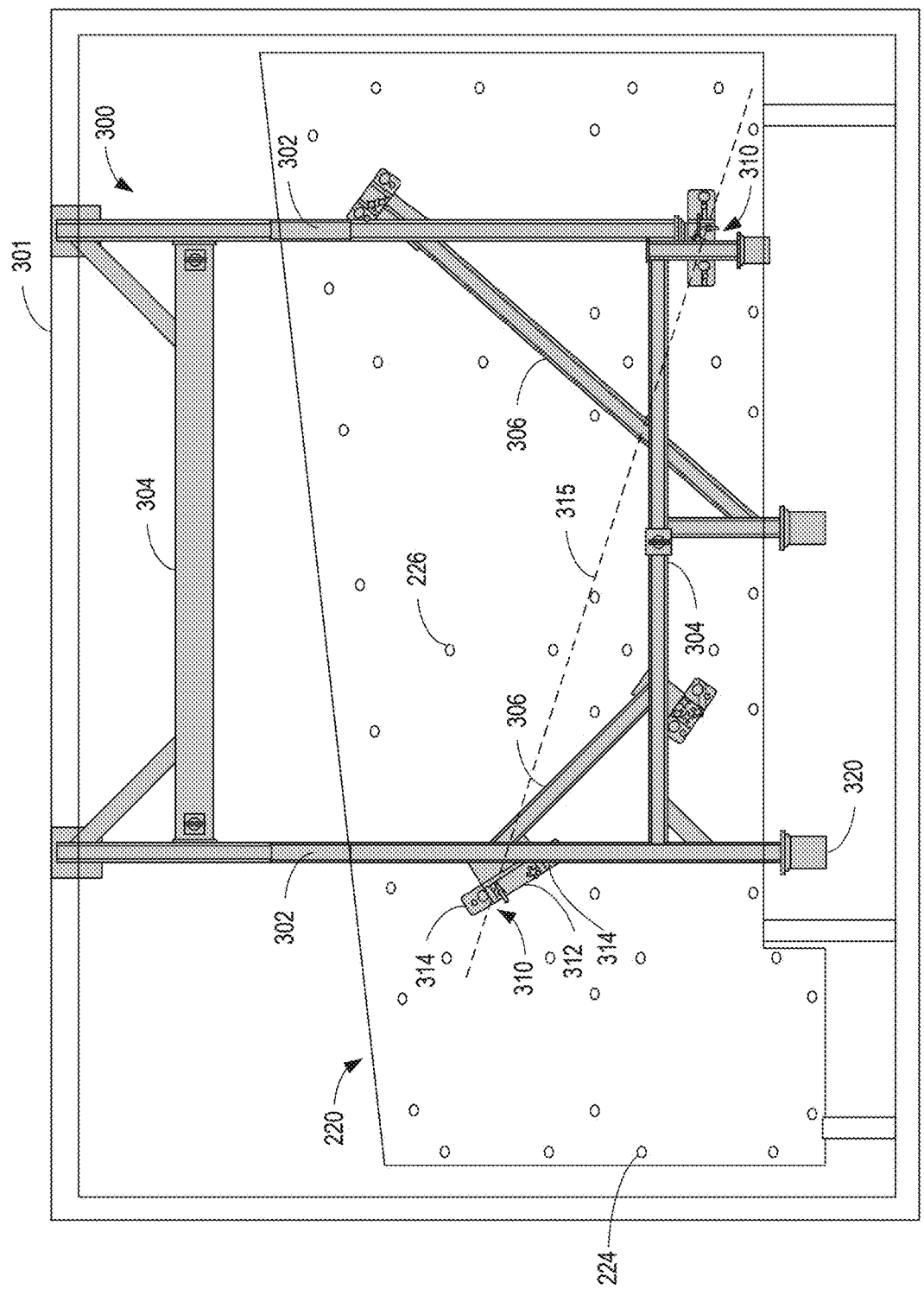
FIGS. 3A and 3B illustrate an example manufacturing structure in accordance with teachings of this disclosure.
Figure 3B:
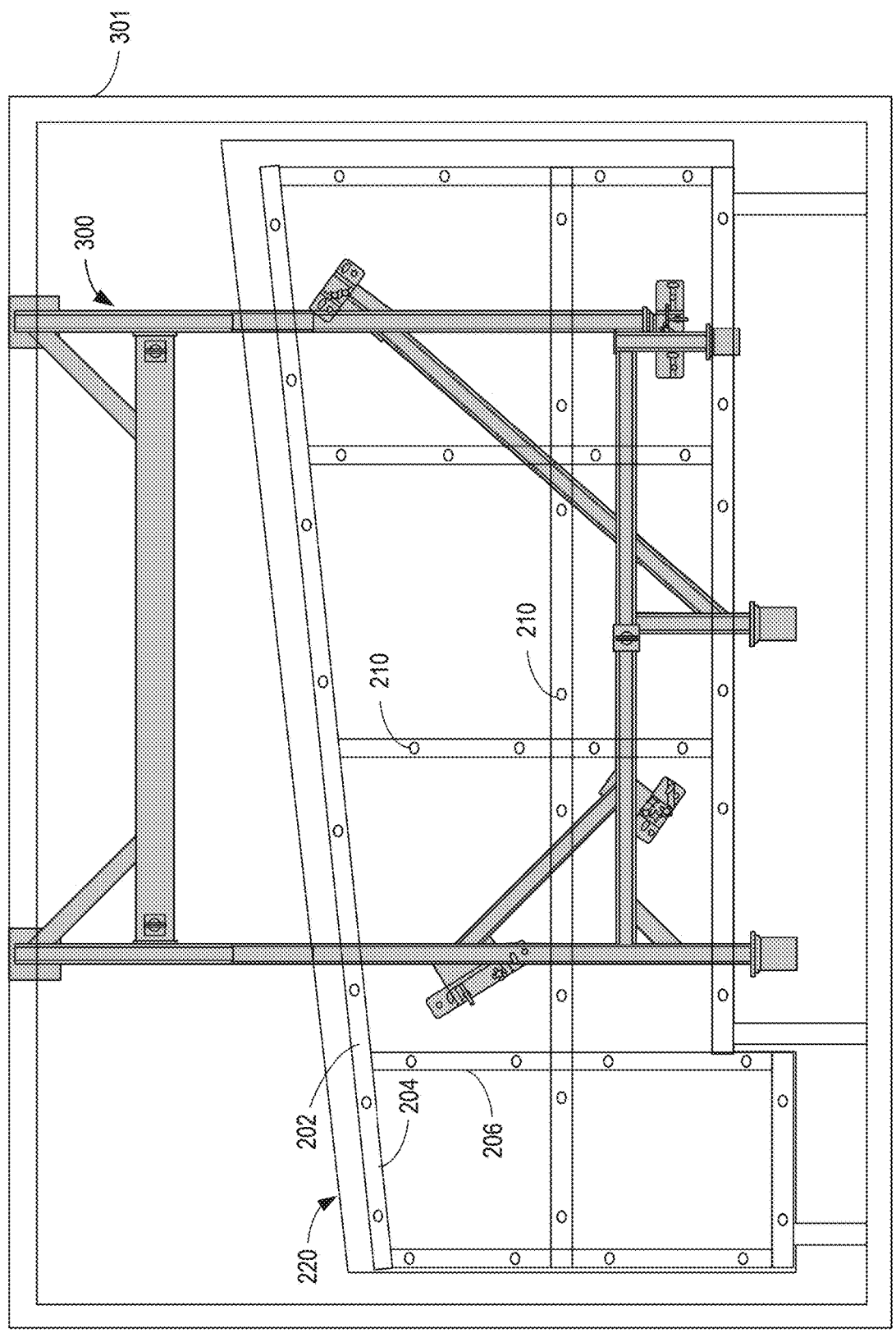

FIGS. 3A and 3B illustrate an example support frame (e.g., an assembly frame, a fixture, an assembly fixture, etc.) 300 in accordance with teachings of this disclosure. In particular, the example support frame 300 is utilized to support the panel 220 shown in FIG. 2B and to aid in supporting the panel during assembly of individual frame sections of the frame structure 202 shown in FIG. 2A. Turning to FIG. 3A, the example support frame 300 is shown with an assembly jig (e.g., an assembly super structure, etc.) 301 and includes vertical beams 302, lateral beams 304, angled beams 306, and holders (e.g., holding devices, clamps, clamping devices, etc.) 310. The example holders 310 are implemented as clamps (e.g., clamping elements) in this example and herein referred to as clamps. In this example, the clamps 310 include a body (e.g., a main body, a central body, a central portion, etc.) 312 with corresponding tabs 314 extending laterally therefrom.

According to examples disclosed herein, to secure the panel 220 to the support frame 300, the aforementioned tabs 314 include apertures extending therethrough. In particular, a fastener (e.g., a pin, a locking pin, a hand knob, a clevis pin, a screw, a bolt, a nut, an insert, etc.) is placed through respective ones of the apertures of the tabs 314 to secure the panel 220 to the frame 300. In this example, the apertures of the tabs 314 in conjunction with the fastener form a relatively tight nominal fit. In this example, the clamps 310 include clamping portions/bodies that are placed on opposite sides (e.g., opposite surfaces, interior and exterior surface, etc.) of the panel 220.

To prevent distortion of the panel 220, which can result in increased difficulty for assembly of subcomponents, at least one of the clamps 310 is enabled to move and/or displace via a slotted and/or oversized clearance interface. According to examples disclosed herein, the clamps 310 are arranged in opposing pairs such that each of the opposing pairs includes a first of the clamps 310 with a bushing having a nominal clearance (e.g., a relatively tight fit) to the support frame 300, thereby defining a nominal clearance interface. In this example, a second of the clamps 310 that is opposing (e.g., positionally opposing, orientationally opposing) to the first of the clamps 310 is enabled to translate and/or pivot due to a slotted clearance (e.g., a relatively loose fit) between the second of the clamps 310 and the support frame 300, thereby defining a slotted interface. According to some examples, the nominal clearance interface can be defined by a round/circular/cylindrical bushing while the slotted clearance can be defined by a slotted/slot-shaped bushing. In this example, a line 315 depicts opposing clamp pairs.

FIG. 3B is a similar view to that shown in FIG. 3A, but depicts the support frame 300 holding the panel 220 in combination with the as-assembled frame structure 202. In this example, separate components and/or portions thereof are assembled to the panel 220 while the panel 220 is supported by the frame 300. In this particular example, subcomponents of the frame structure 202 are assembled to the panel 220. In this example, first subcomponents are assembled to the panel 220 and, in turn, second subcomponents are assembled to the first subcomponents to define the frame structure 202.

FIG. 4 illustrates the example frame 300 of FIGS. 3A and 3B. In the illustrated example of FIG. 4, the frame 300 is shown with multiple ones of the clamps 310 arranged as opposing pairs to one another In this example, the vertical beams 302, the lateral beams 304 and the angled beams 306 are arranged between couplers (e.g., rotational joint couplers, joint interface portions, etc.) 402 and alignment support beams 404. In this example, the alignment beams 404 support and/or align stops (e.g., rotational stops) 406. In some examples, hoist mounts 408 are implemented to move the frame 300 (e.g., to an assembly fixture, facility and/or jig).

Figure 5B:
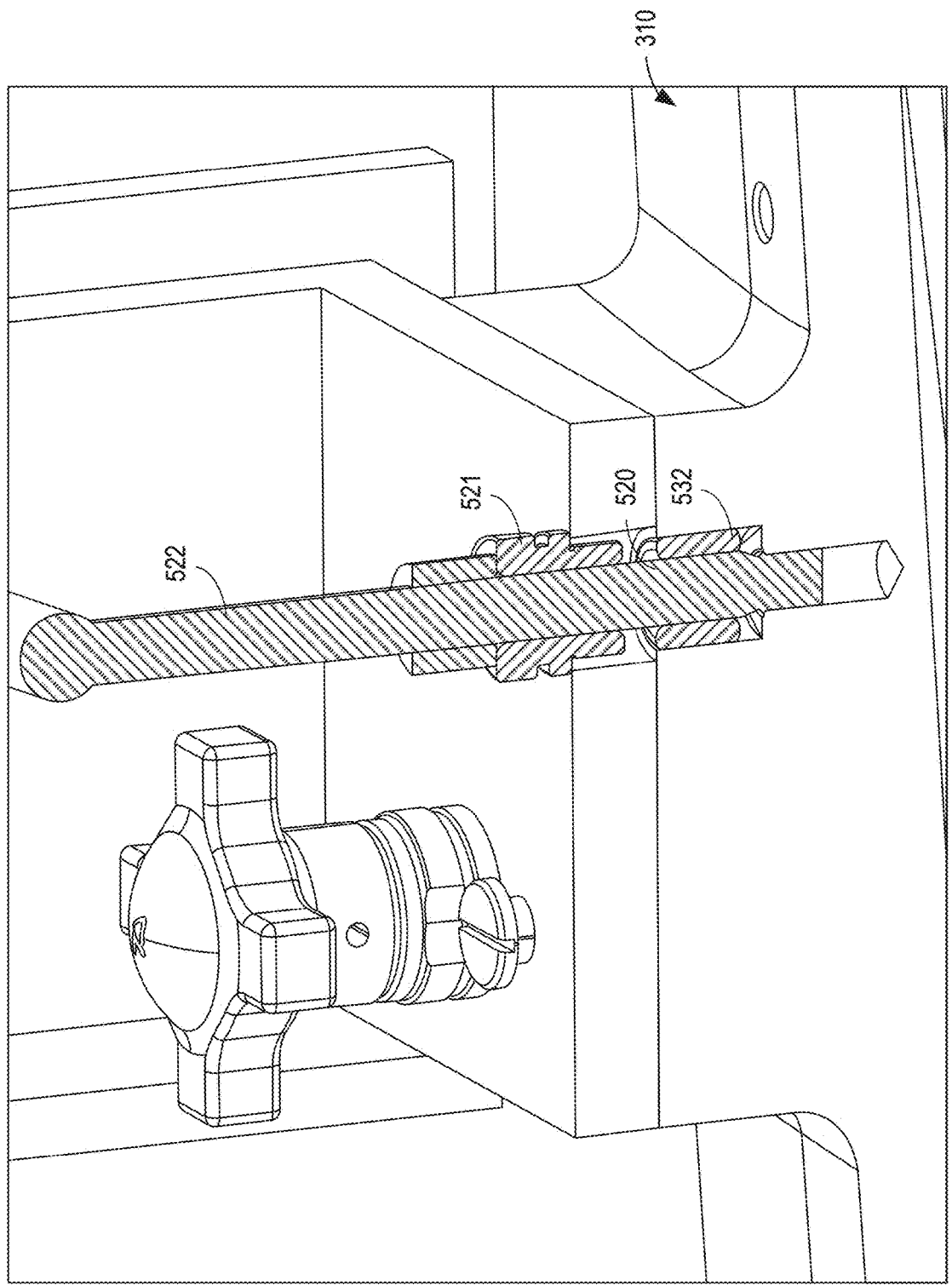

FIGS. 5A and 5B are detailed views of example clamps in accordance with teachings of this disclosure. Turning to FIG. 5A, a detailed view of an example clamp 310 in accordance with teachings of this disclosure is shown. In particular, the clamp 310 shown in FIG. 5A is a first opposing clamp of an opposing clamp pair. The clamp 310 of the illustrated example interfaces with a mount (e.g., a mounting feature, a mounting plate, a mounting component, etc.) 502 of the frame 300 and includes a first clamping body 504 of the main body 312 and a second clamping body 506 of the tab 314 that is separable/separate from the first clamping body 506. The example tab 314 includes apertures 508 extending therethrough. Further, each of the first clamping body 504 and the second clamping body 506 includes a corresponding compressible material (e.g., compressible material body, compressible material layer, a compressible body, etc.) 510 coupled thereto.

To secure the clamp 310 to the panel 220, the second clamping body 506 is placed on a first side of the panel 220 and the first clamping body 504 is placed on a second side of the panel 220 that is opposite to the first side 220. In turn, at least one of pins or fasteners are placed in and/or received by the apertures 508 to pass through a thickness of the panel 220 (e.g., via the apertures 224, 226 shown in FIG. 2B) and at least partially received by the second clamping body 506. In particular, an arrangement of the apertures 508 of the clamps 310 corresponds to at least some of the apertures 224, 226 shown in FIG. 2B. In this example, the compressible material, which can be at least partially composed of an elastomer or other similar material, is utilized for effective clamping of the panel 220 without imparting significant forces.

A first clamp of the clamps 310 is secured to the panel 220 at a first position of the panel. The first clamp includes an aperture 520 that is generally circular is to receive a fastener 522 for fastening the first of the clamp 310 with respect to a mount 502 and/or the support frame 300. A second clamp of the clamps 310 is secured to the panel 220 at a second position that is spaced apart (separated by a distance) from the first clamp secured at a first position of the panel 220.

To enable movement of the second clamp 310 in relation to the mount 502 and/or the frame 300, a slot 512 of a slotted bushing 513 of the mount 502 receives a fastener 514 that is threaded into the body 312 and/or the first clamping body 504. As a result of the ability of the fastener 514 to move relative to or within the slot 512, the clamp 310 can move relative to the frame 300 and/or the mount 502, such that variation in location of the apertures 224, 226 in the panel 220 that the first and second clamps 310 are secured to can be accommodated when fastening the second clamp 310 to the support frame 300, where minor angular adjustment of the panel 220 about the fastener 522 in the first clamp relative to the slot 512 enables insertion of the second fastener 514 through the slot 512 in the second clamp 310 secured to the panel 220. While a slot interface is shown in this example, any appropriate other type of clearance interface/shape can be implemented instead (e.g., an enlarged circular/ellipsoid aperture for clearance, etc.). As a result, the clamp 310 can move, translate and/or pivot as needed to reduce forces imparted to the panel 220 that can distort the panel 220 and, thus, cause manufacturing and/or tolerancing issues for assembly. While a slotted interface is shown in this example, any other appropriate type of clearance fit can be implemented instead including, but not limited to, a gap fit, a floating fit, a rectangular clearance fit, etc. Further, the slotted interface can extend in any appropriate direction (e.g. diagonal to the clamp 310, transverse to the lateral direction of the clamp 310, etc.). In some examples, multiple slotted interfaces are utilized.

Additionally or alternatively, an aperture 520 that is generally circular is to receive a fastener 522 to constrain the clamp 310 in at least one direction with respect to the mount 502 and/or the frame 300. For example, a combination of a slotted interface and a nominal clearance (or floating gap clearance) can be utilized for a clamp 310 to precisely control permitted displacement of the clamp 310. In some examples, the slot 512 and/or the aperture 520 is/are on the clamp 310. While a slotted interface is shown in this example, any other appropriate type of clearance fit can be implemented instead including, but not limited to, a gap fit, a floating fit, a rectangular clearance fit, etc. Further, the slotted interface can extend in any appropriate direction (e.g. diagonal to the clamp 310, transverse to the lateral direction of the clamp 310, etc.).

Turning to FIG. 5B, a second opposing one of the clamps 310 that opposed the clamp 310 shown in FIG. 5A. In the illustrated example of FIG. 5B, an aperture 520 that is generally circular of a bushing 521 is to receive a fastener 522 to constrain the clamp 310 in at least one direction with respect to the mount 502 and/or the frame 300. In some examples, a combination of a slotted interface and a nominal clearance (or floating gap clearance) can be utilized for the clamps 310 to precisely control permitted displacement of the clamp 310. In this example, the fastener 522, which may be identical to the fastener 514 shown in FIG. 5A, is received by (e.g., threaded into) a bushing 532 of the clamp 310 In some examples, the slot 512 (of FIG. 5A) and/or the aperture 520 is/are on the clamp 310. For example, a clamp may include a slotted interface as well as a nominal clearance interface. Additionally or alternatively, multiple slotted interfaces are on a clamp. In some other examples, opposing clamps each include a slotted interface.

Figure 6A:
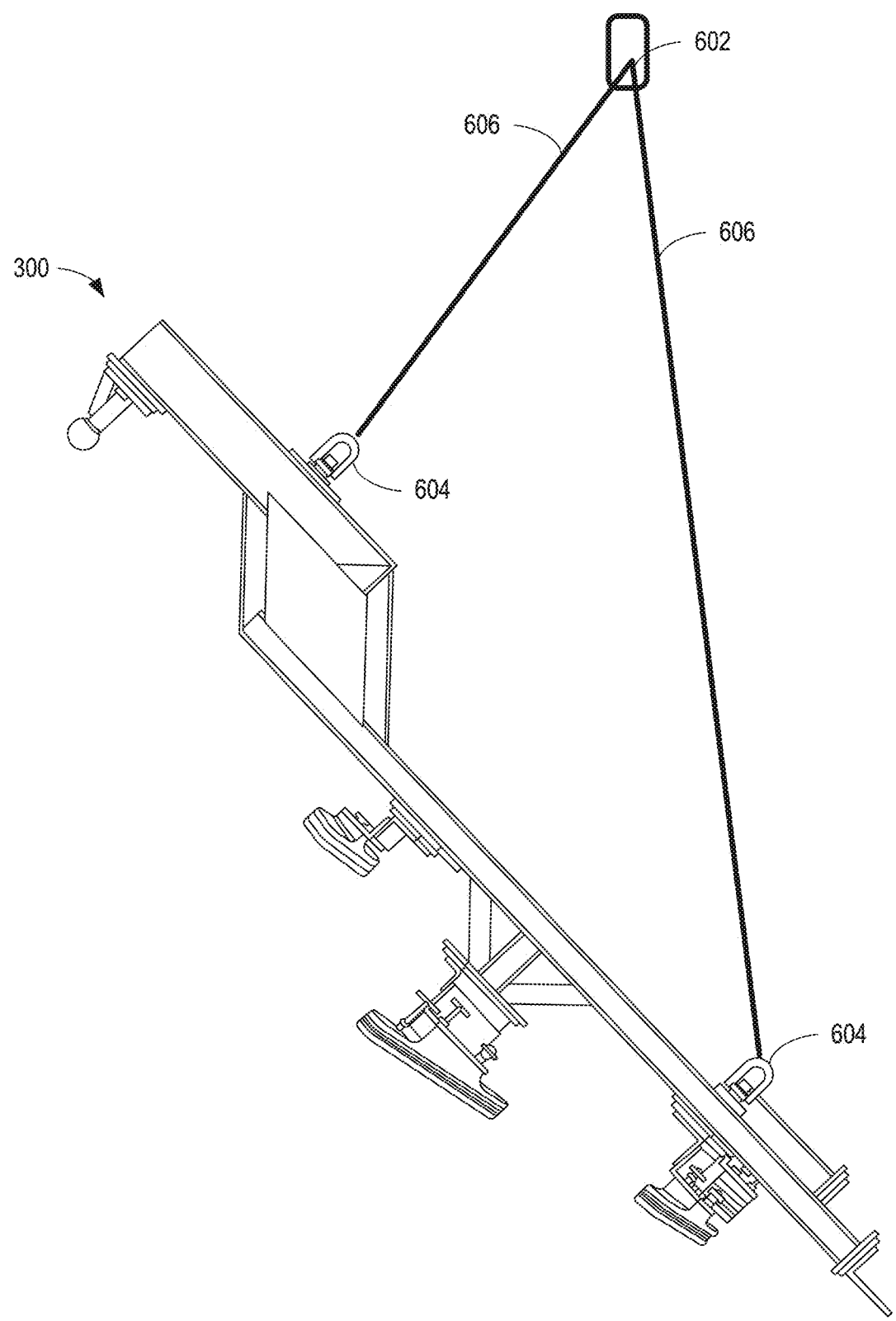
Figure 6B:
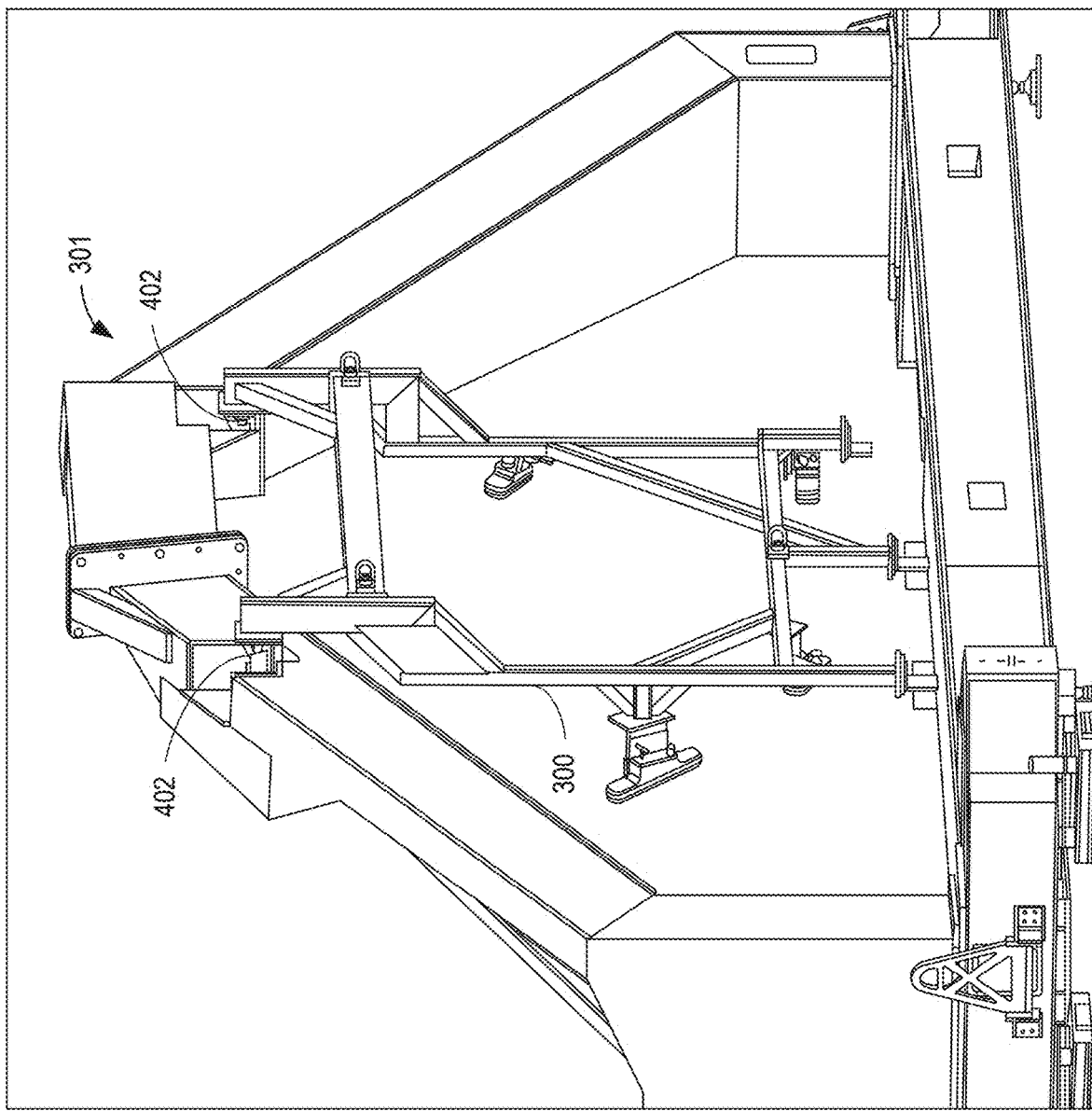

FIGS. 6A-6C illustrate the example support frame 300 of FIGS. 3A-5B for supporting a panel during a manufacturing process. In the illustrated example of FIG. 6A, a side view of the support frame 300 is shown. The example support frame 300 is supported by a hoist 602. In this example, mounts 604 in combination with at least one cable 606 are utilized to support the support frame 300. According to some examples disclosed herein, the support frame 300 and the panel 220 (which is not shown and would be secured via clamps 310) can be oriented at approximately 40 degrees (°) to 50° (e.g., 45°) from the ground.

FIG. 6B depicts the example support frame 300 placed into the aforementioned assembly jig 301 via the couplers 402, which may be utilized to rotationally couple the support frame 300 to the jig 301, thereby defining a rotational joint therebetween. In particular, the support frame 300 carrying the panel 220 (not shown for clarity) can be lifted over to the jig 301 such that the support frame 300 is coupled to and/or releasably couplable to the jig 301 with the couplers 402 and the support frame 300 is able to rotate about the rotational joint until the stops 406 shown in FIG. 4 contact a surface, feature and/or component of the jig 301. In some such examples, the support frame 300 can rotate under the influence of gravity until the stops 406 contact the jig 301 and the panel 220 is in a position and/or orientation (e.g., rotational orientation) such that forces imparted thereto are reduced and/or minimized. In other words, the panel 220 can be rotated via gravity upon the support frame 300 being rotationally coupled to the jig 301. Once the panel is secured to the support frame 300 and the hoisted support frame 300 is coupled via the couplers 402 to the assembly jig 301 so that the assembly jig 301 bears the weight of the support frame 300, the panel 220 may be assembled relative to the vehicle frame structure 202 without the weight of the attached support frame 300 imparting load to the panel 220 or causing distortion in the panel 220 that could cause the apertures 224, 226 in the panel 220 to no longer align with apertures in the frame structure 202 (since the weight of the support frame 300 would not be hanging solely on the panel 220 that is being attached to the frame structure 202 and imparting load to the panel and frame structure).

As mentioned above, according to examples disclosed herein, individual components such as individual frame sections of a vehicle frame structure can be assembled to the panel 220 (and to one another) when the panel 220 and the support frame 300 are supported by the assembly jig 301. For example, vehicle frame sections and components can be assembled to the panel 220. As previously indicated, the weight of a completely assembled frame structure 202 may induce distortion or deflection across the length of frame sections such that apertures 210 in the frame structure 202 may no longer align with apertures 224, 226 in the panel 220, which could cause binding when attempting to install fasteners through the apertures 210, 224 and 226. Where the panel 220 has a plurality of apertures 224, 226 for receiving fasteners to fasten to apertures 210 in the plurality of frame sections (e.g. spars and ribs), the panel 220 having a plurality of apertures 224, 226, at nominal locations establish mounting locations for each of the individual frame sections (e.g. spars and ribs), to provide for alignment and positioning of each individual frame section relative to each other and relative to the large single panel, to thereby enable assembly of the individual frame sections to each other and to the panel without the weight of a completely assembled frame structure 202 inducing distortion or deflection across the length of frame structure that may cause misalignment or binding when attempting to install fasteners.

In the illustrated example of FIG. 6C, a detailed view depicting the couplers 402 of the frame 300 being inserted into couplers 610 is shown. In this example, a rotational joint between the frame 300 and the jig 301 is defined. Particularly, the example couplers 610 of the jig 301 and the couplers 402 of the frame 300 define a rotational interface, which can be implemented as a ball joint (e.g., a ball joint interface) or a clevis joint (e.g., a clevis joint interface).

Figure 7:
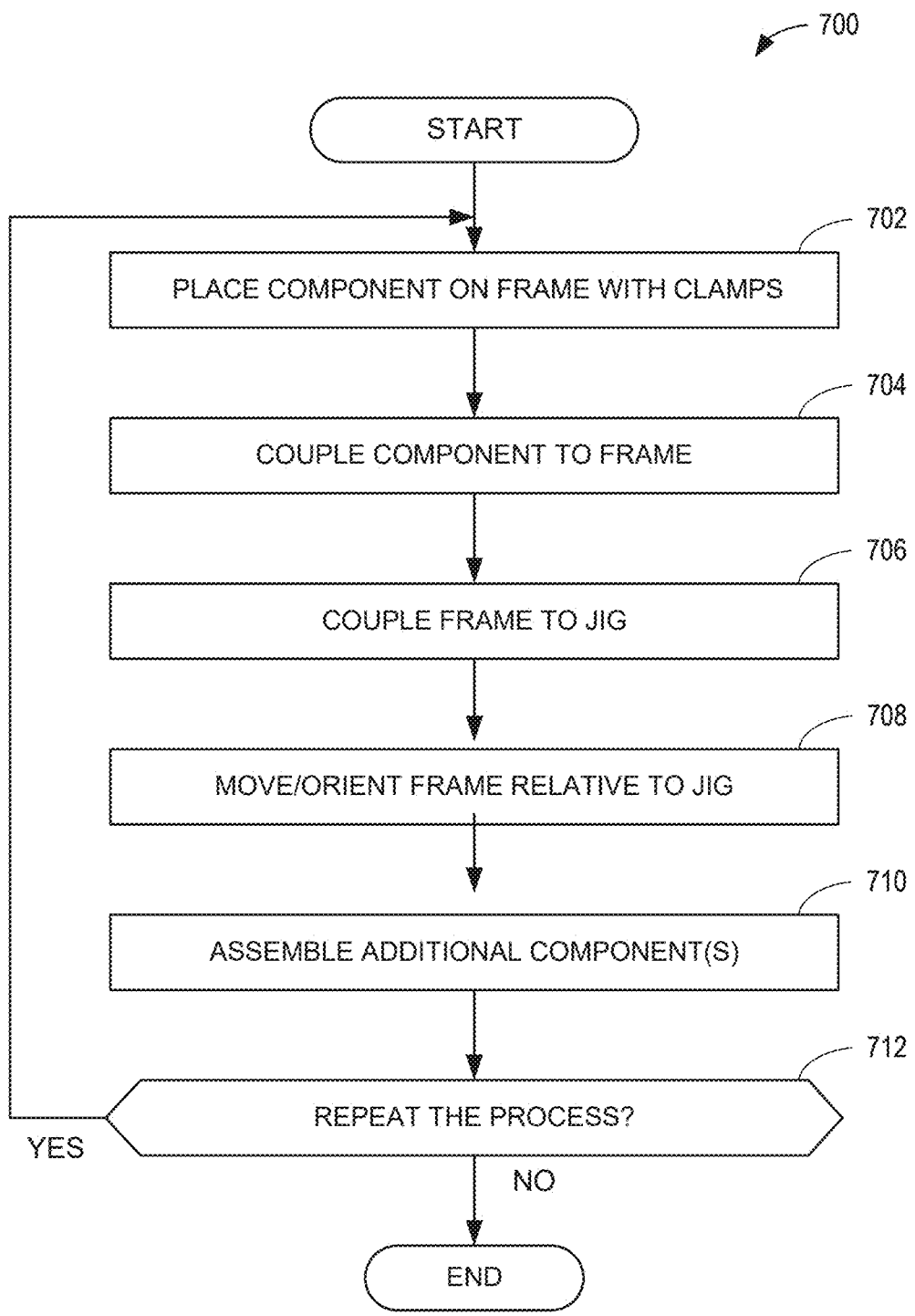
FIG. 7 is a flowchart representative of an example method in accordance with teachings of this disclosure.

FIG. 7 is a flowchart representative of an example method 700 in accordance with teachings of this disclosure. The example method 700 begins as a component, which is a vehicle panel (e.g., a fuselage panel for an aircraft, an aircraft panel, an aircraft skin surface, etc.,) in this example, is to be supported for assembly of subcomponents (e.g., frame subcomponents) thereto. At block 702, an example panel component/workpiece is placed on a support frame (e.g., the support frame 300) via clamps (e.g., the clamps 310). In this example, at least one pair of opposing clamps is utilized to carry and/or support the vehicle panel with a compressible material. A first of the opposing clamps is movable relative to the support frame by a slotted interface defined by at least one of a fastener and/or a pin inserted into an aperture of a corresponding clamp. A second of the opposing clamps is constrained to the support frame with a nominal clearance interface defined by at least one of a fastener and/or a pin.

At block 704, the panel component/workpiece of the illustrated example is coupled to the support frame. In this example, fasteners and/or pins are received by apertures of the opposing clamps to rigidly couple the vehicle panel to the clamps. However, any other appropriate coupling methodology, mechanism and/or device can be implemented instead.

At block 706, according to examples disclosed herein, the support frame is coupled to an assembly jig (e.g., the jig 301). In this example, the support frame is rotationally coupled to the assembly jig. In other examples, the support frame is rigidly constrained to the assembly jig.

At block 708, in some examples, the support frame is moved and/or oriented once coupled to the assembly jig. For example, the support frame can be rotated under the influence of gravity until a surface and/or portion of the support frame contacts another surface to prevent further rotational motion of the support frame.

At block 710, additional frame section components and/or sub-frame components are assembled to the vehicle panel. In this example, frame sections and components are assembled to the vehicle panel, as well as other frame components.

At block 712, it is determined whether to repeat the process. If the process is to be repeated (block 712), control of the process returns to block 702. Otherwise, the process ends. This determination may be based on whether additional panels are to be assembled with components and/or subcomponents.

Figure 8:
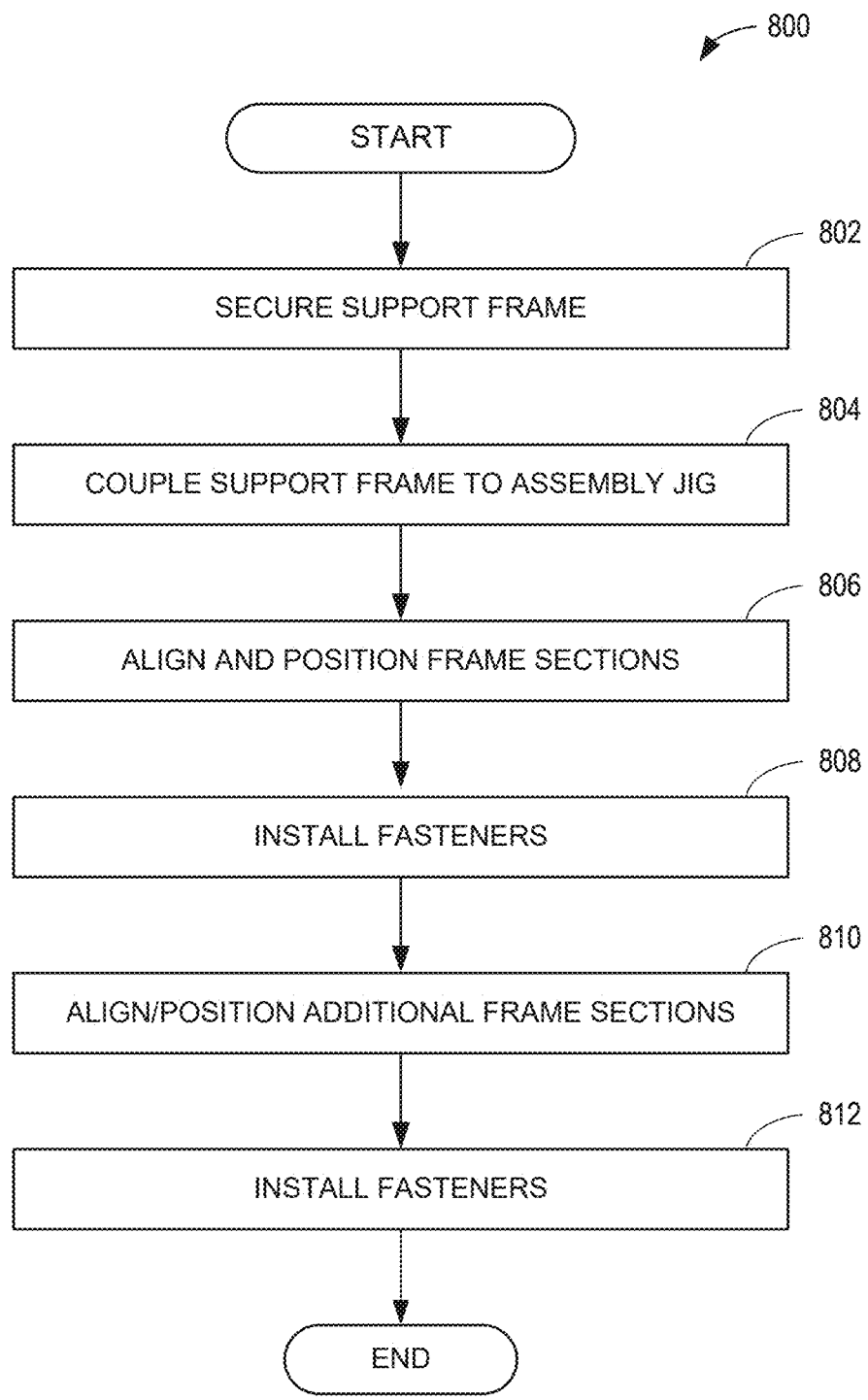
FIG. 8 is a flowchart representative of an example method in accordance with teachings of this disclosure.

In another example in accordance with the present disclosure, a method for assembly of a vehicle frame structure, such as an aircraft wing frame structure, is provided. FIG. 8 is a flowchart representative of an example method 800 in accordance with the present disclosure. At block 802, a support frame (e.g., the support frame 300) is secured, via fasteners fastened relative to a first clamp with a nominal interface and a second clamp with a slotted interface, to panel component (e.g., the panel 220) having a plurality of apertures at nominal locations that establish mounting locations for aligning/positioning each of a plurality of individual frame sections relative to each other and the panel.

At block 804, the example support frame is coupled to an assembly jig (e.g., the jig 301) so that the assembly jig bears the weight of the support frame 300 (such that the weight of the support frame is not hanging solely on the panel that is to be attached to a frame structure and could cause distortion of the panel and/or frame structure).

At block 806, the plurality of apertures in the example panel are utilized for aligning and positioning at least a first frame section having mating apertures and an adjoining second frame section having mating apertures relative to each other and relative to the apertures in the panel.

At block 808, in this example, fasteners are installed through the apertures in the panel and the mating apertures in the first frame section and in the adjoining second frame section.

At block 810, according to examples disclosed herein, the plurality of apertures in the panel are utilized for aligning and positioning additional frame sections having mating apertures in an adjoining manner relative to at least one of the first frame section and second frame section and relative to the apertures in the panel.

At block 812, in this example, fasteners are installed through the apertures in the panel and the mating apertures in the additional frame sections that adjoin at least one of the first frame section and second frame section, such that each of the frame sections are assembled to an adjoining frame section to form an elongate frame structure that is fastened to a single panel to enable assembly of a vehicle structural assembly. The installation of fasteners through apertures in the panel and mating apertures in individual adjoining frame sections positioned relative to apertures in the panel enable assembly of an elongate frame structure and panel without the weight of a completely assembled frame structure imparting distortion that may cause misalignment of apertures and binding when installing fasteners through the apertures. In turn, the process ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Example methods, apparatus, systems, and articles of manufacture to facilitate determinant assembly of gravitationally compromised structures are disclosed herein. Further examples and combinations thereof include the following:

Example 1 includes an apparatus to support a panel component for determinant assembly thereof, the apparatus includes a support frame that is releasably couplable to a jig, a first clamp to support the panel component at a first position of the panel component, a first body of the first clamp or the support frame including a nominal clearance opening to receive a first fastener to operatively couple the first clamp to the support frame, and a second clamp to support the panel component at a second position of the panel component different from the first position, a second body of the second clamp or the support frame including a slotted opening to receive a second fastener to operatively couple the second clamp to the support frame, the second fastener movable about the slotted opening to enable the second clamp to reduce forces imparted to the panel component while held by the support frame.

Example 2 includes the apparatus as defined in example 1, wherein the nominal clearance opening is a first nominal clearance opening and the slotted opening is a first slotted opening, wherein the first clamp includes a second slotted opening, and wherein the second clamp includes a second nominal clearance opening.

Example 3 includes the apparatus as defined in example 1, wherein the nominal clearance opening is defined by a cylindrical bushing and the slotted opening is defined by a slotted bushing.

Example 4 includes the apparatus as defined in example 1, wherein the first and second clamps are opposingly positioned relative to one another.

Example 5 includes the apparatus as defined in example 1, wherein the first and second bodies include first and second bushings, respectively, to define the nominal clearance opening and the slotted opening, respectively.

Example 6 includes the apparatus as defined in example 1, wherein the panel component is a skin panel for a vehicle.

Example 7 includes the apparatus as defined in example 6, wherein the first and second clamps each include an aperture to receive a fastener to couple the first and second clamps to the panel.

Example 8 includes a method for determinant assembly of a structural assembly for use with an aircraft, the method comprising coupling, with a first fastener, a first clamp supported by a support frame to a first portion of the panel, the first clamp including a nominal clearance interface with respect to the support frame, coupling, with a second fastener, a second clamp supported by the support frame to a second portion of the panel different from the first portion, the second clamp including a slot interface with respect to the support frame, coupling the support frame to an assembly jig, positioning adjoining frame sections having mating apertures relative to each other and relative to apertures in the panel, and installing fasteners through apertures in the panel and mating apertures in the adjoining frame sections, such that each of the frame sections are assembled to an adjoining frame section to form an assembled frame structure fastened to a panel to yield a structural assembly.

Example 9 includes the method as defined in example 8, further including moving the support frame to contact a stop of the assembly jig in response to the support frame being rotationally coupled to the assembly jig.

Example 10 includes the method as defined in example 9, wherein the support frame is coupled to the assembly jig via a rotational joint such that upon coupling the support frame to the assembly jig at the rotational joint, the support frame is rotated about the rotational joint until a stop of the support frame contacts a surface of the assembly jig.

Example 11 includes the method as defined in example 10, wherein the support frame is rotated about the rotational joint to move the stop to contact the surface based on gravity.

Example 12 includes the method as defined in example 9, wherein the support frame carrying the panel is coupled to the assembly jig via a ball joint.

Example 13 includes the method as defined in example 8, further including coupling the support frame to a hoist, the hoist to move the support frame carrying the panel to the assembly jig.

Example 14 includes the method as defined in example 8, wherein the panel is a skin panel, and further including coupling the adjoining frame sections to the panel in response to the frame being mounted to the assembly jig.

Example 15 includes the method as defined in example 14, wherein the adjoining frame sections comprise a first frame section and a second frame sections.

Example 16 includes the method as defined in example 8, further including coupling the support frame to the assembly jig via a rotational coupler, and rotating the support frame to an orientation at which a stop of the support frame contacts a surface of the assembly jig to prevent further rotation thereof.

Example 17 includes the method as defined in example 16, wherein the support frame rotates for the stop to contact the surface by gravity in response to the coupling of the support frame to the assembly jig.

Example 18 includes a support frame for determinant assembly of a vehicle panel, the support frame comprising first and second holders carried by the support frame, the first and second holders including or supporting first and second clamps, respectively, to carry the vehicle panel at different areas thereof, a nominal clearance interface to constrain the first holder or the second holder, and a slotted interface on another of the first holder or the second holder to enable movement thereof to reduce forces imparted onto the vehicle panel.

Example 19 includes the support frame as defined in example 18, wherein the first and second holders are opposingly positioned relative to one another.

Example 20 includes the support frame as defined in example 18, wherein the vehicle panel includes a body with apertures, with one or more of the apertures to receive a fastener to secure the frame to the first and second holders.

Example 21 includes the support frame as defined in example 18, wherein the first and second holders define a clamping interface with a compressible material positioned between corresponding clamping portions.

Example 22 includes the support frame as defined in example 18, wherein the compressible material is a compressible layer.

Example 23 includes the support frame as defined in example 18, further including a rotational joint coupler to rotationally couple the support frame to an assembly jig.

Example 24 includes the support frame as defined in example 23, further including a stop to restrict rotation of the support frame in at least one rotational direction thereof.

Example 25 includes the support frame as defined in example 18, wherein the clearance interface is defined by an aperture of the first holder having a first diameter, and the slotted interface defined by a second aperture of the second holder having a second diameter greater than the first diameter.

Example 26 includes a method of determinant assembly of a vehicle panel, the method comprising placing a first clamping holder of a support frame at a first position of the panel, the first clamping holder having a nominal clearance interface with the support frame, placing a second clamping holder of the support frame at a second position of the panel different from the first position, the second clamping holder having a slot interface with the support frame to enable movement of the second clamping holder, and coupling frame sections to the panel while the panel is supported by the first and second clamping holders.

Example 27 includes the method as defined in example 26, further including moving, with a hoist, the support frame carrying the panel to an assembly jig.

Example 28 includes the method as defined in example 27, further including coupling the support frame to the assembly jig, wherein the frame section is coupled to the panel when the support frame is coupled to the assembly jig.

Example 29 includes the method as defined in example 26, wherein the frame section is a first frame section, and further including coupling a second frame section to the first frame section.

Example 30 includes the method as defined in example 26, further including coupling the support frame carrying the panel to an assembly jig.

Example 31 includes the method as defined in example 30, wherein the support frame is coupled to the assembly jig via a rotational joint.

Example 32 includes the method as defined in example 31, wherein, upon rotational coupling of the support frame to the assembly jig, the support frame is to rotate under the influence of gravity until a stop of the support frame contacts a portion of the assembly jig to prevent further rotation of the support frame.

Example 33 includes the method as defined in example 26, wherein the support frame component is coupled to the panel via fasteners received by apertures of the panel.

Example 34 includes the method as defined in example 26, wherein the panel is an aircraft wingskin.

Example 35 includes an apparatus for determinant assembly of an aircraft panel, the apparatus comprising a support frame having a plurality of support beams, and first and second opposing holders supported by the support frame, the first holder having a nominal clearance fit to the support frame, the second holder having a slotted fit to the support frame for movement thereof, the first and second holders each having an aperture to receive a fastener to couple the first and second holders to the panel.

Example 36 includes the apparatus as defined in example 35, further including a joint to couple the support frame to an assembly jig.

Example 37 includes the apparatus as defined in example 36, wherein the joint is a rotational joint between the support frame and the assembly jig.

Example 38 includes the apparatus as defined in example 37, further including a stop of the support frame to define an angular rotational range of the support frame with respect to the assembly jig.

Example 39 includes the apparatus as defined in example 35, wherein the first holder includes a first clamp having first and second clamping bodies separated by a first compressible body, and wherein the second holder includes a third and fourth clamping bodies separated by a second compressible body.

Example 40 includes the apparatus as defined in example 35, further including a hoist to carry the support frame with the panel to an assembly jig.

Example 41 includes a method of determinant assembly of a vehicle frame structure, the method comprising securing a first clamping holder of a support frame at a first position on a panel and securing a second clamping holder of the support frame at a second position on the panel different from the first position, and securing the support frame to the first clamping holder and the second clamping holder such that the support frame is coupled to and supporting the panel, the panel having a plurality of apertures at nominal locations that establish mounting locations for aligning/positioning each of a plurality of individual frame sections relative to each other and the panel. The method further comprises coupling the support frame to an assembly jig, such that the assembly jig bears the weight of the support frame so that the weight of the support frame does not impart a substantial load to the panel. The method further includes utilizing the plurality of apertures in the panel for aligning and positioning at least a first frame section having mating apertures and an adjoining second frame section having mating apertures relative to each other and relative to the apertures in the panel. The method further includes installing fasteners through the apertures in the panel and the mating apertures in the first frame section and in the adjoining second frame section. The method further includes utilizing the plurality of apertures in the panel for aligning and positioning additional frame sections having mating apertures, the additional frame sections being positioned in an adjoining manner relative to at least one of the first frame section and second frame section and relative to the apertures in the panel. The method further includes installing fasteners through the apertures in the panel and the mating apertures in the additional frame sections that adjoin at least one of the first frame section and second frame section, such that each of the frame sections are assembled to an adjoining frame section to form an elongate frame structure that is also fastened to the panel. The method enables assembly of an elongate frame structure and panel without the weight of the support frame causing distortion and misalignment of apertures in the panel that cause binding during installation of fasteners.

From the foregoing, it will be appreciated that example systems, apparatus, articles of manufacture, and methods have been disclosed that enable relatively quick and effective assembly of components that can otherwise be difficult to assemble. Examples disclosed herein can mitigate the effects of gravity or other forces on relatively large and/or heavy components that can be subject to bending and warpage, which can increase a difficulty of assembly of other components thereto. Examples disclosed herein can also reduce manufacturing time as well as rejected components and/or reworking typically associated with conventional manufacturing techniques.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to support a panel component for determinant assembly thereof, the apparatus comprising:
    a support frame that is releasably couplable to a jig;
    a first clamp to support the panel component at a first position of the panel component, a first body of the first clamp or the support frame including a nominal clearance opening to receive a first fastener to operatively couple the first clamp to the support frame; and
    a second clamp to support the panel component at a second position of the panel component different from the first position, a second body of the second clamp or the support frame including a slotted opening to receive a second fastener to operatively couple the second clamp to the support frame, the second fastener movable about the slotted opening to enable the second clamp to reduce forces imparted to the panel component while held by the support.

2. The apparatus as defined in claim 1, wherein the nominal clearance opening is a first nominal clearance opening and the slotted opening is a first slotted opening, wherein the first clamp includes a second slotted opening, and wherein the second clamp includes a second nominal clearance opening.

3. The apparatus as defined in claim 1, wherein the nominal clearance opening is defined by a circular bushing and the slotted opening is defined by a slotted bushing.

4. The apparatus as defined in claim 1, wherein the first and second clamps each include a compressible material between respective clamping bodies.

5. The apparatus as defined in claim 1, wherein the panel component is a skin panel for a vehicle.

6. The apparatus as defined in claim 5, wherein the first and second clamps each include an aperture to receive a fastener to couple the first and second clamps to the panel.

7. A method for determinant assembly of a structural assembly for use with an aircraft, the method comprising:
    coupling, with a first fastener, a first clamp supported by a support frame to a first portion of a panel, the first clamp including a nominal clearance interface with respect to the support frame;
    coupling, with a second fastener, a second clamp supported by the support frame to a second portion of the panel different from the first portion, the second clamp including a slot interface with respect to the support frame;
    coupling the support frame to an assembly jig, and
    positioning adjoining frame sections having mating apertures relative to each other and relative to apertures in the panel, and
    installing fasteners though apertures in the panel and mating apertures in the adjoining frame sections, such that each of the frame sections are assembled to an adjoining frame section to form an assembled frame structure fastened to a panel to yield a structural assembly.

8. The method as defined in claim 7, further including moving the support frame to contact a stop of the assembly jig in response to the support frame being rotationally coupled to the assembly jig.

9. The method as defined in claim 8, wherein the support frame is coupled to the assembly jig via a rotational joint such that upon coupling the support frame to the assembly jig at the rotational joint, the support frame is rotated about the rotational joint until a stop of the support frame contacts a surface of the assembly jig.

10. The method as defined in claim 9, wherein the support frame is rotated about the rotational joint to move the stop to contact the surface due to the influence of gravity.

11. The method as defined in claim 8, wherein the support frame carrying the panel is coupled to the assembly jig via a ball joint or a clevis joint.

12. The method as defined in claim 7, further including coupling the support frame to a hoist, the hoist to move the support frame carrying the panel to the assembly jig.

13. The method as defined in claim 7, further including:
    coupling the support frame to the assembly jig via a rotational coupler; and
    rotating the support frame to an orientation at which a stop of the support frame contacts a surface of the assembly jig to prevent further rotation thereof.

14. The method as defined in claim 13, wherein the support frame rotates for the stop to contact the surface by gravity in response to the coupling of the support frame to the assembly jig.

15. A support frame for determinant assembly of a vehicle panel, the support frame comprising:
    first and second holders carried by the support frame, the first and second holders including or supporting first and second clamps, respectively, to carry the vehicle panel at different areas thereof;

a nominal clearance interface to constrain the first holder or the second holder; and a slotted interface on another of the first holder or the second holder to enable movement thereof to reduce forces imparted onto the vehicle panel.

16. The support frame as defined in claim 15, wherein the vehicle panel includes a body with apertures, with one or more of the apertures to receive a fastener to secure the frame to the first and second holders.

17. The support frame as defined in claim 15, wherein the first and second holders define a clamping interface with a compressible material positioned between corresponding clamping portions.

18. The support frame as defined in claim 15, further including a rotational joint coupler to rotationally couple the support frame to an assembly jig.

19. The support frame as defined in claim 18, further including a stop to restrict rotation of the support frame in at least one rotational direction thereof.

20. The support frame as defined in claim 15, wherein the clearance interface is defined by an aperture of the first holder having a first diameter, and the slotted interface defined by a second aperture of the second holder having a second diameter greater than the first diameter.

* * * * *